(12) United States Patent
Takebe (10) Patent No.: US 6,404,833 B1
(45) Date of Patent: Jun. 11, 2002

(54) DIGITAL PHASE SYNCHRONIZING APPARATUS (75) Inventor: Makoto Takebe, Hiratsuka (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 09/156,890

(22) Filed: Sep. 18, 1998

(51) Int. Cl.[7] ............... H04L 7/00; H04L 25/00; H04L 25/40
(52) U.S. Cl. ............... 375/371; 327/152; 327/153; 348/512
(58) Field of Search ............... 375/371; 370/517, 370/519; 327/152, 153; 348/512, 537

(56) References Cited

U.S. PATENT DOCUMENTS

| 5,022,056 | A | * | 6/1991 | Henderson et al. | 375/119 |
| 5,533,072 | A | * | 7/1996 | Georgiou et al. | 375/371 |
| 5,686,968 | A | * | 11/1997 | Ujiie et al. | 348/521 |
| 5,809,095 | A | * | 9/1998 | Nakao | 375/374 |
| 5,841,482 | A | * | 11/1998 | Wang et al. | 348/537 |
| 6,041,089 | A | * | 3/2000 | Yokomizo | 375/371 |

FOREIGN PATENT DOCUMENTS

JP  3151737  6/1991

* cited by examiner

Primary Examiner—Jean Corrielus
(74) Attorney, Agent, or Firm—Greer, Burns, & Crain, Ltd.

(57) ABSTRACT

A digital phase synchronizing apparatus delays sequentially a clock signal output from an oscillator, generates a plurality of delayed clock signals, selects a delayed clock signal that is synchronized with horizontal synchronizing signal HS from among the delayed clock signals using a change point detection circuit, and selects the output signal. Meanwhile, fine delay circuit further delays sequentially the selected delayed clock signal, generates a plurality of delayed clock signals, and selects a delayed clock signal that corresponds to the setting of a rotary dip switch as the system clock, thereby to efficiently acquire phase synchronization of the clock signal with the input signal without being affected by the signal characteristics of the input signal.

7 Claims, 7 Drawing Sheets

DIGITAL PHASE SYNCHRONIZING APPARATUS

BACKGROUND OF THE INVENTION

1. Field of the Invention

The present invention relates to a digital phase synchronizing apparatus for synchronizing the phase of a clock signal generated by a signal generator with the phase of an input signal, and more particularly to a digital phase synchronizing apparatus which can efficiently achieve the phase synchronization between a clock signal and input signal without being affected by the signal characteristics of the input signal.

2. Description of the Related Art

Technology for receiving as image data a VGA signal in which a horizontal synchronizing signal and analog data are input from outside, or an NTSC video signal in which a horizontal synchronizing signal is generated internally through synchronous separation have been known.

In such technology, the clock signal of a receiver which receives image data was generated using a high precision, liquid crystal oscillator. The phase of this clock signal was required to conform to the input signal.

Up to now, a PLL (phase locked loop) or the like was used to ensure phase synchronization of the received data signals. However, the use of a PLL has such problems that bit rate is decreased for the reception channel, and a large-sized loop gain stabilizing capacitor as well as a large number of analog circuits are necessary.

To solve the problems, Japanese Patent Laid-open Publication No. 3-151737 discloses a digital phase synchronizing method and arrangement in which a plurality of delayed clock signals are generated by using a plurality of delaying means, these delayed clock signals are compared to the receiver input signal, and which of the plurality of delayed clock signals has a phase closest to the receiver input signal is determined.

However, this conventional technology has the problem that, when an input signal of only "0" or "1" is successively input, and the input signal does not change for a prescribed time, then none of the delayed clock signals is selected, as a result of which phase synchronization is not achieved.

For this reason, when receiving a VGA signal or NTSC signal using this conventional technology, the input signal and clock signal are not synchronized with each other when the input signal does not change for a prescribed time, and therefore, the image cannot be correctly reproduced.

SUMMARY OF THE INVENTION

It is an object of the present invention to provide a digital phase synchronizing apparatus which resolves the aforementioned problems and can efficiently achieve the phase synchronization between the clock signal and the input signal without being affected by the signal characteristics of the input signal.

In order to achieve the aforementioned object, the present invention provides a digital phase synchronizing apparatus for synchronizing the phase of a clock signal generated by a signal generator with a phase of an input signal, comprising delayed signal generating means for delaying sequentially clock signals generated by the signal generator and generating a plurality of delayed clock signals having different amount of delay; and selecting means for selecting a delayed clock signal changing at rising edge or falling edge of a horizontal synchronizing signal from among the plurality of delayed clock signals generated by the delayed signal generating means.

With the above configuration, the following effects can be achieved.

1) The phase synchronization of a clock signal and input signal is efficiently achieved without being affected by the signal characteristics of the input signal.
2) The system clock can remain phase synchronized with the horizontal synchronizing signal.
3) Synchronization with the sender of the horizontal synchronizing signal can continually be achieved.

The digital phase synchronizing apparatus according to the present invention may further comprise fine adjusting means for delaying sequentially the delayed clock signal selected by the selecting means, generating a plurality of delayed clock signals having different amount of delay, and selecting a delayed clock signal responding to the fine adjusting operation from among the plurality of delayed clock signals generated.

As a result, the present invention can resolve phase errors between the horizontal synchronizing signal and delayed clock signal selected by the selection means.

Further, the delayed signal generating means may be designed to generate a plurality of delayed clock signals having delays of one or more periods using a delay circuit including at least one or more inverters so as to prevent the collapse of the duty ratio following delay.

Furthermore, the selecting means may be designed to comprise a plurality of flip-flops for detecting status of each of the delayed clock signals at the rising edge or falling edge of the horizontal synchronizing signal; and change point detecting means for receiving detected signals from the plurality of flip-flops and detecting a delayed clock signal having a change point which changes at the rising edge or falling edge of the horizontal synchronizing signal so that the apparatus can efficiently specify a delayed clock signal having a point of change changing at the rising edge or falling edge (hereinafter called change point) of the horizontal synchronizing signal.

The change point detecting means may be designed to detect only the delayed clock signal having the least delay when there are a plurality of delayed clock signals having change point changing at the rising edge or falling edge of the horizontal synchronizing signal so that the apparatus unambiguously specifies a delayed clock signal even in the case where the delay of the delayed clock signal exceeds one period.

The selecting means may be designed to effect pull-up or pull-down of output of each of the flip-flops and excludes the metastable state so the apparatus can prevent the output of the flip-flops being in a metastable state.

The selecting means may be designed to input each of the delayed clock signals generated by the generating means to a plurality of tri-states corresponding to each of the delayed clock signals, and outputs the delayed clock signals input to the prescribed tri-state using an output signal from the change point detecting means so that the apparatus can make uniform the delay times required until signal output, even when the tri-state generating the output is considered.

DESCRIPTION OF THE PREFERRED EMBODIMENTS

The embodiment of the present invention is explained below with reference to the accompanied drawings.

Figure 1:
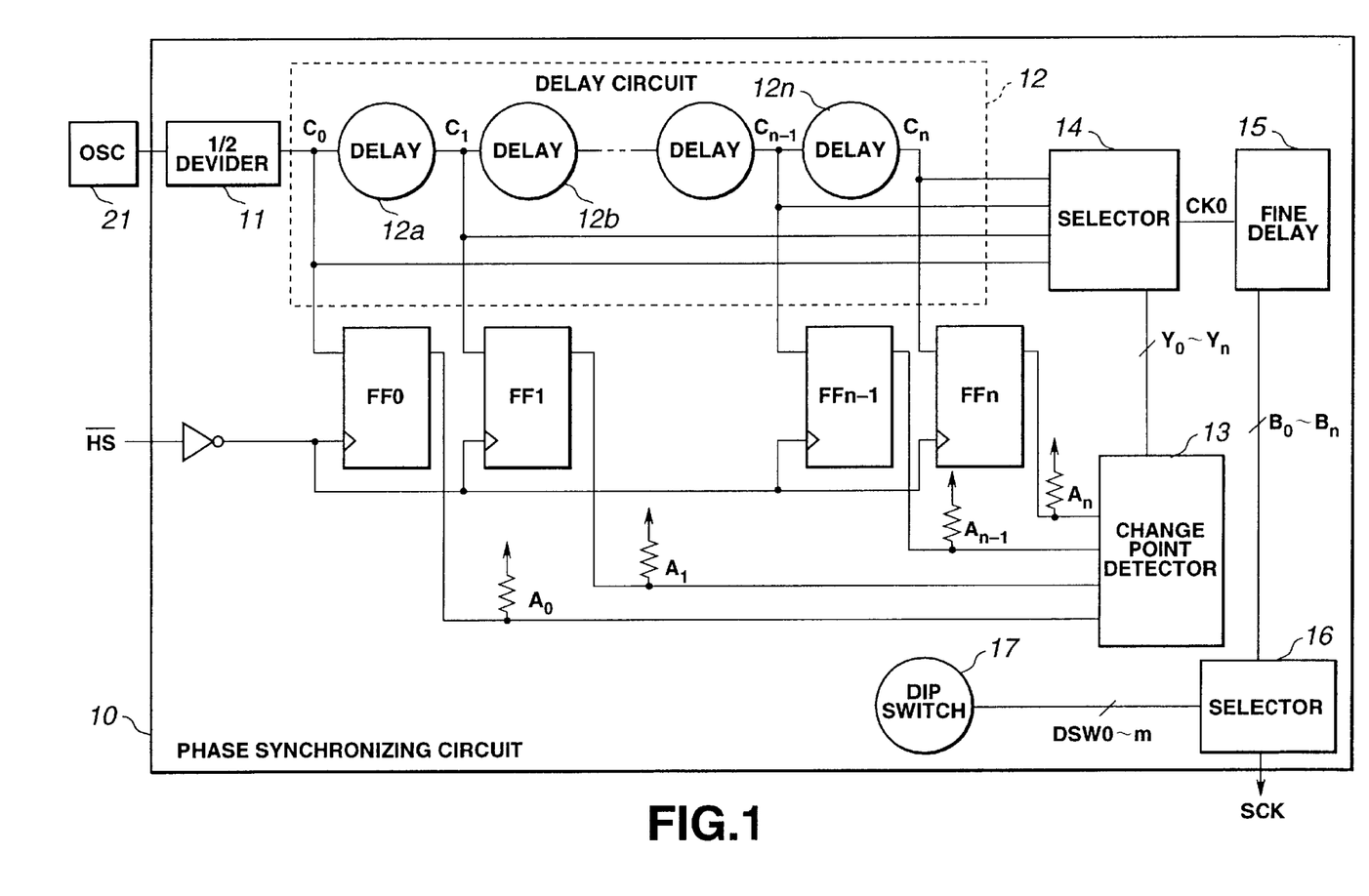
FIG. 1 is a diagram showing the circuit configuration of a phase synchronizing circuit relating to an embodiment of the present invention.

Referring to FIG. 1 which is a diagram showing the circuit configuration of a phase synchronizing circuit relating to an embodiment of the present invention, the phase synchronizing circuit 10 delays sequentially clock signals output from an oscillation circuit (OSC) 21 so as to generate a plurality of delayed clock signals C0–Cn, and selects a delayed clock signal which matches the horizontal synchronizing signal HS and generates an output signal CKO using a change point detection circuit 13.

Then, a fine delay circuit 15 further delays sequentially the delayed clock signals CK0 so as to generate a plurality of delayed clock signals, and selects a delayed clock signal corresponding to the setting of a rotary dip switch 17 as a system clock SCK.

As described above, the phase synchronizing circuit 10 does not simply synchronize the input signal and clock signal, but outputs a system clock which is constantly synchronized with the horizontal synchronizing signal.

The specific operation of this phase synchronizing circuit 10 is now described.

In the phase synchronizing circuit 10 as shown in FIG. 1, the clock signal output from the OSC 10 is frequency-divided in half by a frequency divider circuit 11 and then input to a delay circuit 12 comprising a serially connected n delay elements (referred to below as "delays") 12a–12n.

The delayed clock signals C0–Cn–1 input to the delays 12a–12n are then output to the D terminals of D-type flipflops (referred to below as "FF") FF0–Ffn provided for each delay and a selector 14 for selecting the clock signal.

A horizontal synchronizing signal is input to the clock terminals of the FF0–Ffn via an inverter and output signals A1–An from the Q terminals of the FF0–Ffn are output to a change point detection circuit 13. Moreover, to prevent a metastable state which is produced when set up time and hold time are not maintained, the output of each FF0–Ffn are pulled-up or pulled-down.

The change point detection circuit 13 carries out change point detection processing, discussed below, on the basis of the signals A0–An to generate signals Y0–Yn relating to the change point, and outputs the signals Y0–Yn to the selector 14.

Afterwards, the selector 14 selects one of the delayed clock signals C0–Cn on the basis of the signals Y0–Yn and outputs the selected signal CK0 to the fine delay circuit 15.

For example, when Y0 is "high" and Y1–Yn are "low", the delayed clock signal C0 is selected as the signal CK0.

When Y1 is "high" and Y0 and Y2–Yn are "low", the delayed clock signal C1 is selected as the signal CK0.

The fine delay circuit 15 uses a serial circuit comprising serially connected delay elements, as in the delay circuit 12, to output delayed clock signals B0–Bn, with CK0 delayed sequentially, to a selector 16.

The selector 16 selects a delayed clock signal associated with the setting of the rotary dip switch 17 from among the delayed clock signals B0–Bn and output it as the system clock SCK.

As described above, the phase synchronizing circuit 10 is configured so that the phase of the system clock signal is adjusted to synchronize with the phase of the horizontal synchronizing signal each time the horizontal synchronization is performed so that the phase synchronization with the sender of the horizontal synchronizing signal is always maintained.

Also, the phase synchronizing circuit 10 is configured so as to perform fine adjustment of the signal CK0 with the fine delay circuit 15, rather than using the signal CK0 selected by the selector 14 as the system clock so that the deviation between the change point of the data and the horizontal synchronizing signal can be eliminated.

The configuration of the phase synchronizing circuit 10 relating to the present embodiment has been explained above.

Next, an image receiving apparatus using that phase synchronizing circuit 10 is explained.

Figure 2:
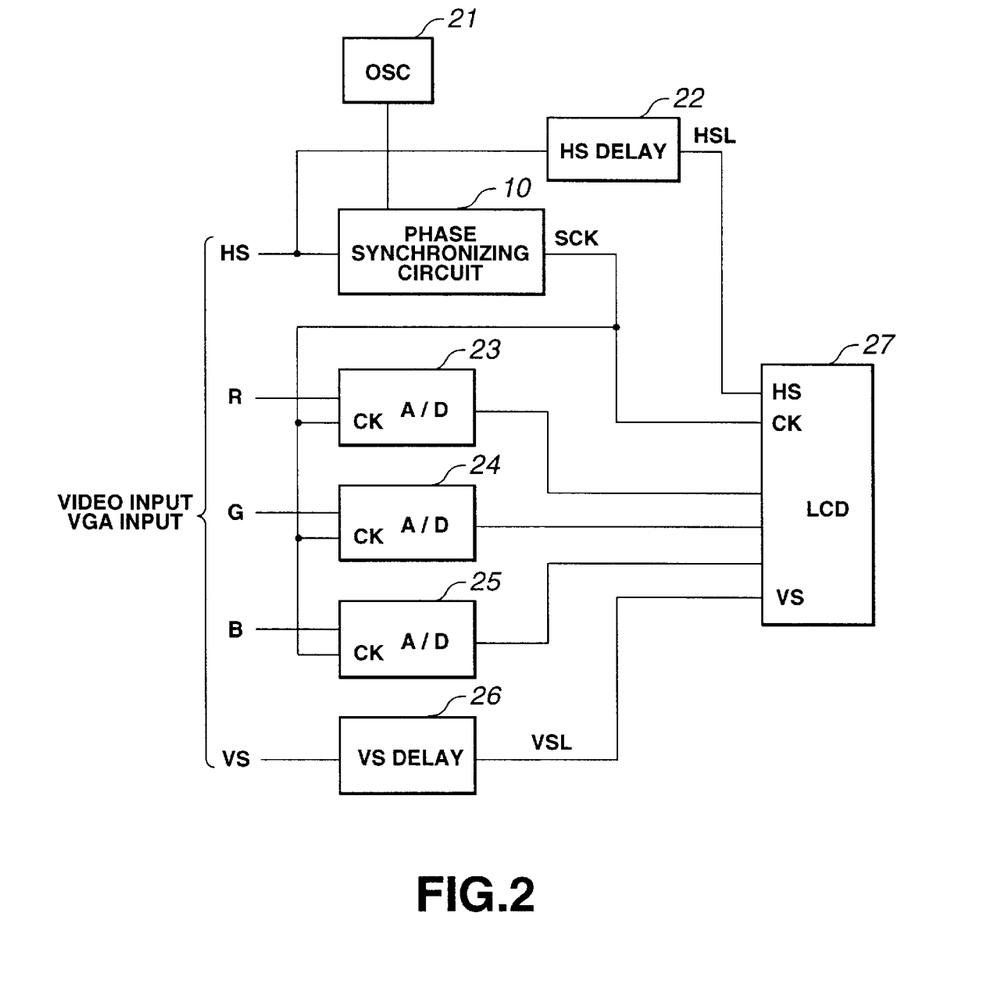
FIG. 2 is a diagram showing an example of an image receiving apparatus having the phase synchronizing circuit shown in FIG. 1.

FIG. 2 shows an example of an image receiving apparatus comprising the phase synchronizing circuit 10 shown in FIG. 1. In this image receiving apparatus as shown in this figure, the phase synchronizing circuit 10 shown in FIG. 1 is provided between an oscillator 21 and A/D converters 23–25 and LCD 27. As a result, the phase synchronizing circuit 10 outputs a system clock signal SCK, which remains in phase synchronization with the horizontal synchronizing signal HS, to the clock terminals of the LCD 27 and A/D converters 23–25.

Consequently, on the basis of the system clock signal SCK which remains phase synchronization with the horizontal synchronizing signal HS, the A/D converters 23–25 perform A/D conversion of the R, G, and B components of a VGA signal or analog image signal and output a converted digital signal to the LCD 27.

Because of this, the LCD 27 becomes able to acquire an image signal without phase deviation and synchronized with the horizontal synchronizing signal. Moreover, the delayed horizontal synchronizing signal HS and vertical synchronizing signal VS are each input to the LCD 27 by way of an HS delay circuit 22 and a VS delay circuit 26.

Figure 3:
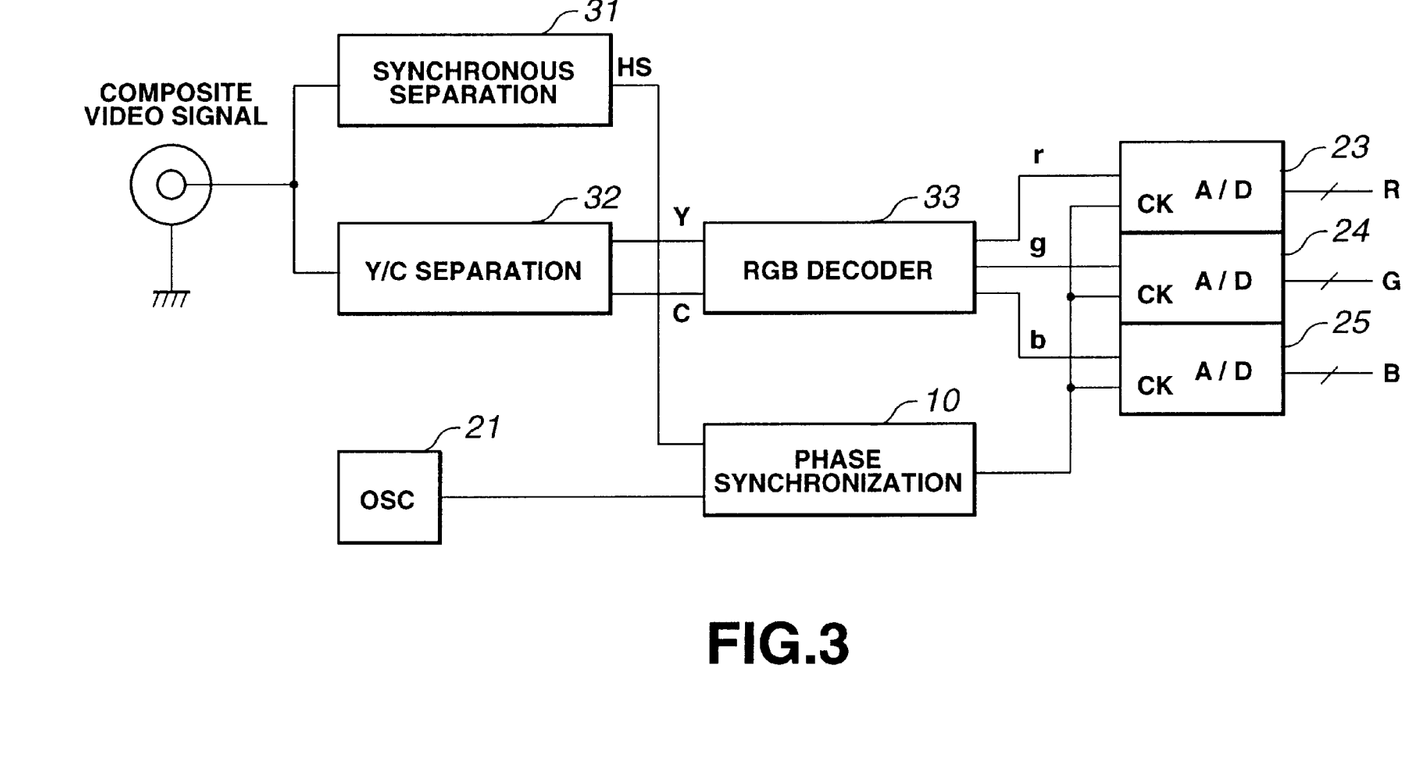
FIG. 3 is a diagram showing another example of an image receiving apparatus having the phase synchronizing circuit shown in FIG. 1.

FIG. 3 shows another example of an image receiving apparatus using the phase synchronizing circuit 10 shown in FIG. 1.

In the image receiving apparatus as shown in this figure, the phase synchronizing circuit 10 shown in FIG. 1 is provided between an oscillator 21 and A/D converters 23–25. As a result, a system clock signal SCK remaining in phase synchronization with the horizontal synchronizing signal HS, which is separated by a synchronous separation circuit 31 from the composite video signal, is output to the clock terminals of the A/D converters 23–25.

Consequently, if luminescence signal Y and color signal C, separated from a composite video signal by a Y/C separation circuit 32, are converted by a RGB decoder 33 to RGB coordinate signals r, g, and b, then these r, g, and b signals are converted to R, G, and B signals on the basis of the system clock which remains in phase synchronization with the horizontal synchronizing signal HS.

Because of this, it becomes possible to acquire an image signal with no phase deviation and which is synchronized with the horizontal synchronizing signal, even in the case of such a composite video signal.

An example of the application of the phase synchronizing circuit 10 shown in FIG. 1 to an image receiving apparatus has been explained above.

Next, the delays 12a–12n forming the delay circuit 12 shown in FIG. 1 are explained.

Figure 4A:
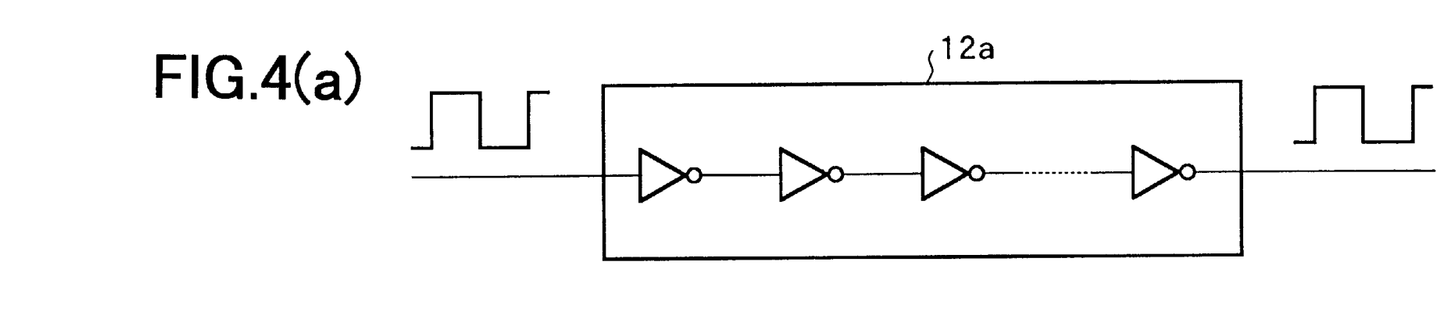
FIGS. 4(a) and 4(b) are diagrams showing a detail of the delay forming the delay circuit shown in FIG. 1.
Figure 4B:
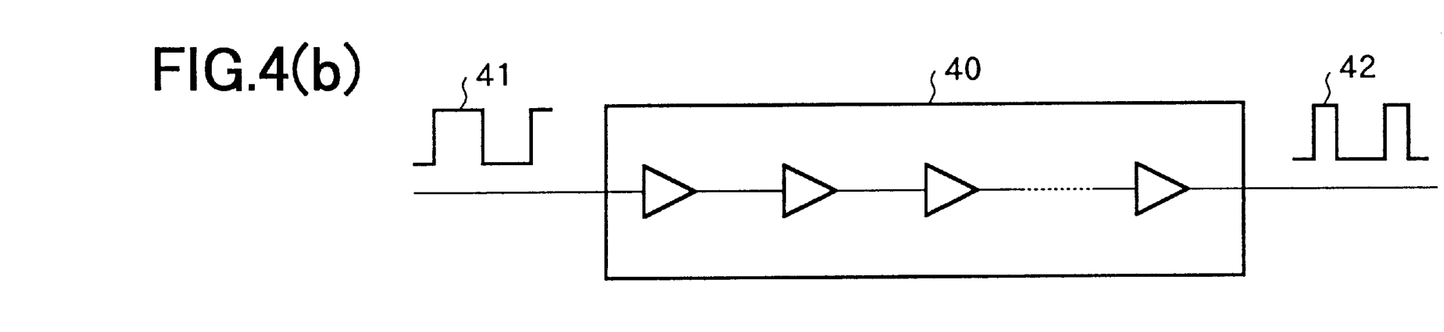

FIGS. 4(a) and 4(b) show the configuration of the delay 12a forming the delay circuit 12 shown in FIG. 1.

As shown in FIG. 4 (a), the delay 12a comprises a plurality of serially connected inverters.

When using a chain of buffers 40 as shown in FIG. 4(b), the waveform of an input clock signal 41 is deformed like an output clock signal 42, causing the destruction of its duty ratio.

For this reason, in the present embodiment, the delay circuit 12 is realized by constituting the delay 12a using inverters which do not result in this destruction of the duty ratio.

Moreover, although only the delay 12a was shown in this explanation for purposes of convenience, the delays 12b–12n are configured in the same manner. A requisite condition is that the delays 12a–12n be equivalent to one another.

Next, the constitution of the change point detection circuit 13 shown in FIG. 1 is explained.

Figure 5:
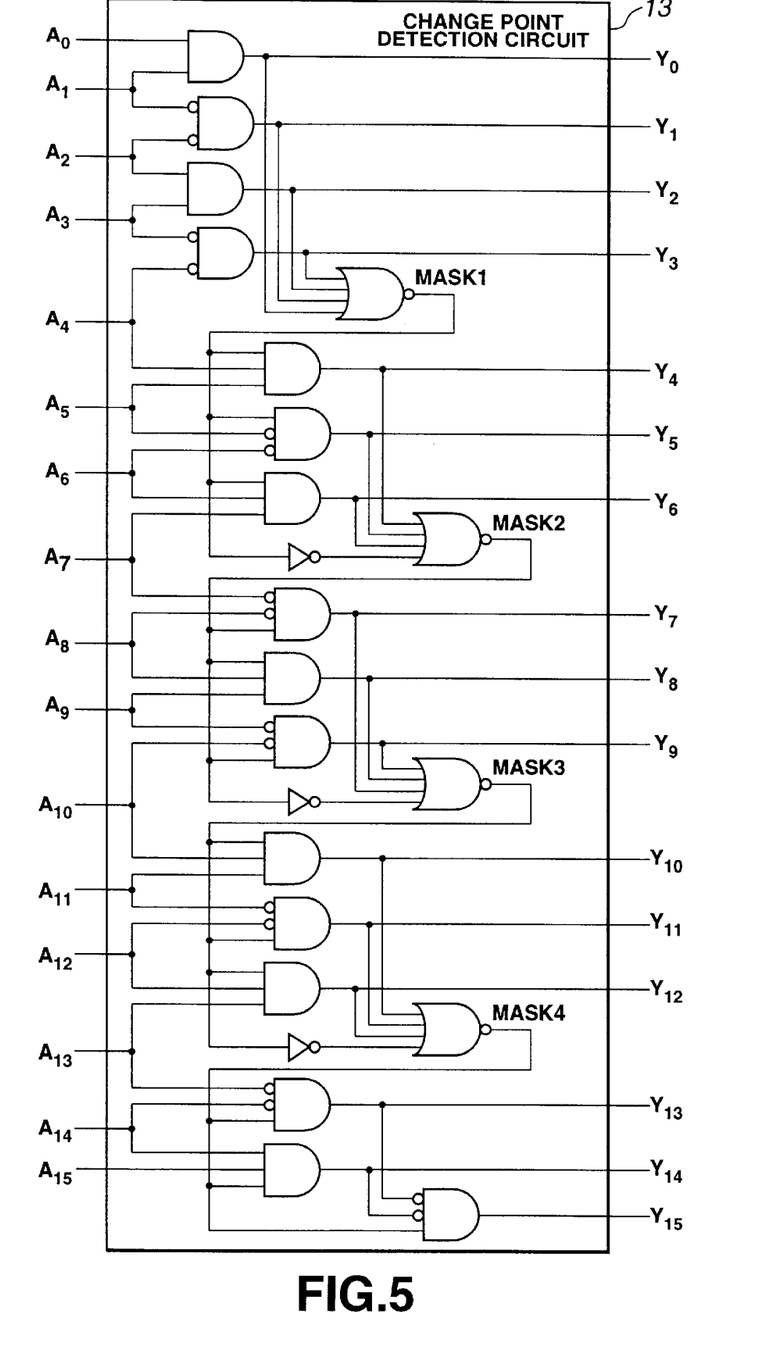
FIG. 5 is a diagram showing the configuration of the change point detecting circuit shown in FIG. 1.

FIG. 5 shows the configuration of the change point detection circuit 13 shown in FIG. 1.

The change point detection circuit 13 shown in this figure shows the case where n is 15, in other words when the delay circuit 12 has 16 delays, and an odd number of inverters are established for each delay.

The change point detection circuit 13 is a circuit which detects whether the rising edge or falling edge (referred to below as "change point") of any of the delayed clock signals C0–Cn corresponds to the falling edge of the horizontal synchronizing signal HS.

Specifically, the change point detection circuit 13 detects whether the falling edge of the horizontal synchronizing signal HS is located between the rising edge of the delayed clock signal C0 and the falling edge of the delayed clock signal C1, or is located between the falling edge of the delayed clock signal C1 and the rising edge of the delayed clock signal C2, or corresponds to the rising edge or falling edge of another clock signal.

In the present embodiment, the relationship between the falling edge of the horizontal synchronizing signal HS and the change point of the delayed clock signal is called "status".

Figure 6:
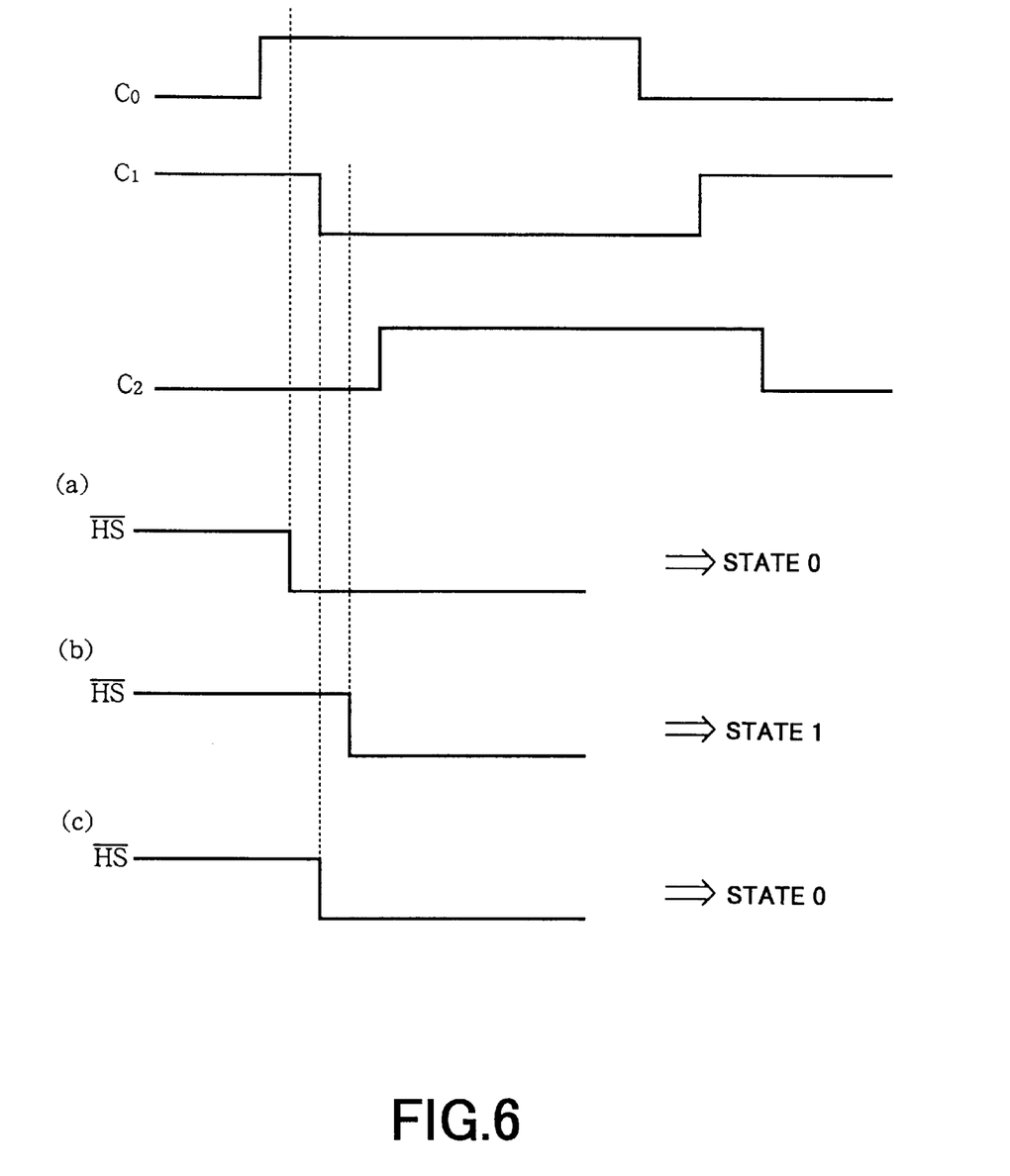
FIG. 6 is a diagram showing the relationship between the falling edge of the horizontal synchronizing signal and the delayed clock signal shown in FIG. 1.

In FIG. 6, as shown in (a), the falling edge of the horizontal synchronizing signal HS is located between the rising edge of the delayed clock signal C0 and the falling edge of the delayed clock signal C1. This status is called "status 0".

As shown in (b) of this figure, the falling edge of the horizontal synchronizing signal HS is located between the falling edge of the delayed clock signal C1 and the rising edge of the delayed clock signal C2. When the falling edge of the horizontal synchronizing signal HS is located between the rising edge of the delayed clock signal C14 and the falling edge of the delayed clock signal C15, the status becomes "status 14".

In status 0, since A0 which is the output of FF0 and A1 which is the output of FF1 both become "high", the Y0 which is the logical product of A0 and A1 becomes "high" and the output of MASK1 becomes "low". Consequently, the output of MASK2 through MASK4 also becomes "low" and as a result, all output after Y4 becomes "low".

Moreover, because A1 is "high", Y1 becomes "low". When the period of the clock pulse is taken into consideration, Y2 and Y3 become also "low".

Consequently, in status 0, only Y0 is "high" and Y1–Y15 are "low" for the output signal of the change point detection circuit 13. Moreover, the selector 14, which received these output signals Y0–Y15, selects C0 as the output signal CK0 and outputs this to the fine delay circuit 15.

In status 1, since A1 and A2 both are "low", Y0 becomes "low", Y1 becomes "high", Y2 becomes "low", Y3 becomes "low", and Y4–Y15 become "low". As a result, only Y1 becomes "high"

In the case where the horizontal synchronizing signal falls down at the same time as the falling of the clock signal C1 as shown in (c) of FIG. 6, the output of FF1 is in a metastable state because set up time and hold time are not satisfied. Because a pull-up resistor is provided in the output, A1 becomes "high". Therefore, the status of this case is status 0.

By using this change point detection circuit 13 in the above-described manner, it can be detected which of the delayed clock signals C0–Cn whose change point changes at the falling edge of the horizontal synchronizing signal HS.

Also, by providing masks 1–4, the change point detection circuit 13 does not detect two or more change points, even in the case where the delay of the clock is greater than one period.

Figure 7:
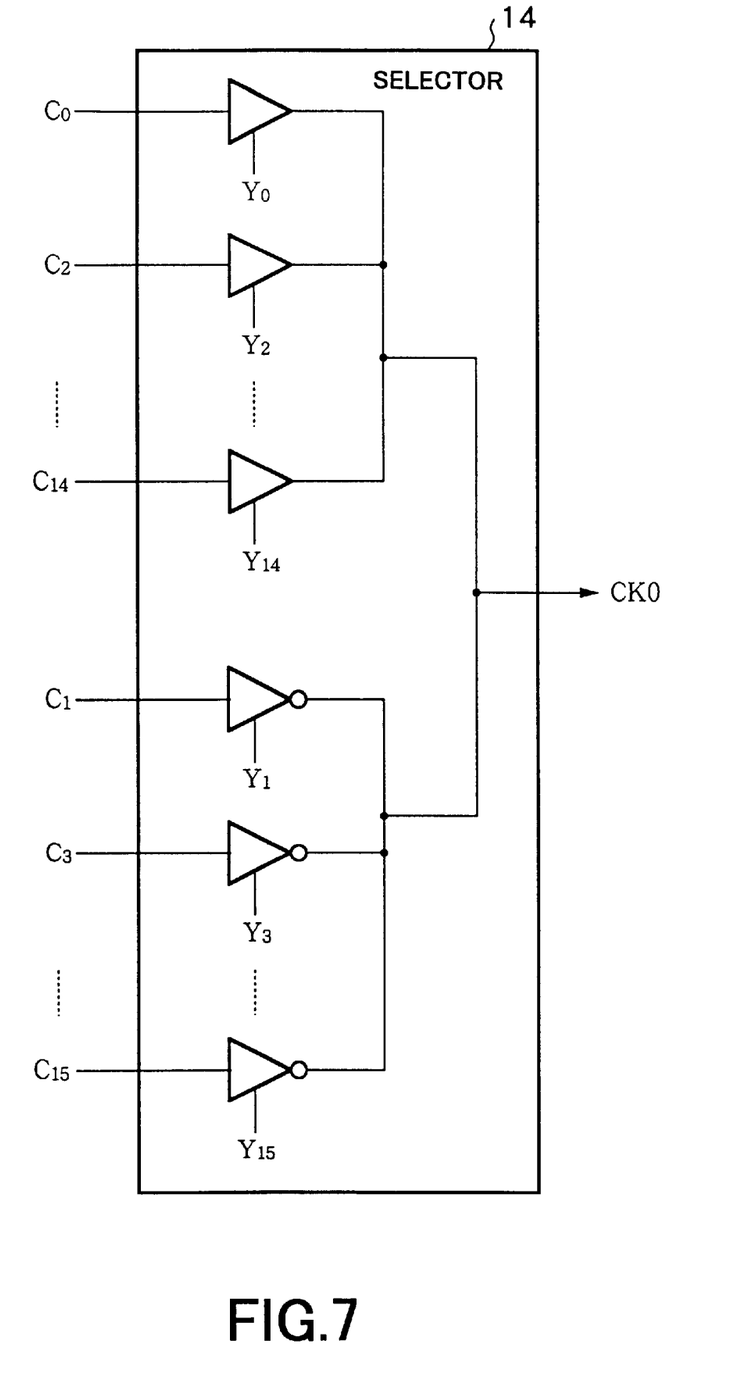
FIG. 7 is a diagram showing the configuration of a selector in the case where the delay circuit comprises an odd number of inverters.

Moreover, when odd number of inverters are present in each of the delays 12a–12n of the delay circuit 12, odd numbered clock signals such as C1 or C3 are inverted. Therefore, as shown in FIG. 7, it is necessary to invert the clock signals. For this purpose, an inverter is provided within the selector 14.

This selector 14 is configured to input the delayed clock signals C0–Cl5 to respective try states and output a delayed clock signal which is synchronized in phase with the horizontal synchronizing signal HS by using output signals Y0–Y15 from the change point detection circuit 13. With this configuration, the delay times required until the signal CK0 is output can be made uniform for the output from any try state.

What is claimed is:

1. A digital phase synchronizing apparatus, comprising:
   delayed signal generating means for sequentially delaying a clock signal generated by a signal generator and generating a plurality of delayed clock signals having different amounts of delay;
   selecting means for selecting a delayed clock signal changing at a rising edge or a falling edge of a horizontal synchronizing signal from among the plurality of delayed clock signals generated by the delayed signal generating means; and
   fine adjusting means for delaying sequentially the delayed clock signal selected by the selecting means, generating a plurality of delayed clock signals having different amounts of delay, and selecting a delayed clock signal corresponding to a fine adjusting operation from among the plurality of delayed clock signals generated, whereby a phase of the clock signal generated by the signal generator is synchronized with a phase of the horizontal synchronizing signal.

2. The digital phase synchronizing apparatus according to claim 1, wherein the delayed signal generating means generates a plurality of delayed clock signals having delays of one or more periods using a delay circuit including at least one or more inverters.

3. The digital phase synchronizing apparatus according to claim 1, wherein the selecting means comprises:

a plurality of flip-flops for detecting status of each of the delayed clock signals at the rising edge or falling edge of the horizontal synchronizing signal; and change point detecting means for receiving detected signals from the plurality of flip-flops and detecting a delayed clock signal having a change point which changes at the rising edge or falling edge of the horizontal synchronizing signal.

4. The digital phase synchronizing apparatus according to claim 3, wherein the change point detecting means detects only the delayed clock signal having the least delay when there are a plurality of delayed clock signals having change point changing at the rising edge or falling edge of the horizontal synchronizing signal.

5. The digital phase synchronizing apparatus according to claim 3, wherein the selecting means effects pull-up or pull-down of output of each of the flip-flops and excludes the metastable state.

6. The digital phase synchronizing apparatus according to claim 3, wherein the selecting means inputs each of the delayed clock signals generated by the generating means to a plurality of tri-states corresponding to each of the delayed clock signals, and outputs the delayed clock signals input to the prescribed tri-state using output signal from the change point detecting means.

7. A digital phase synchronizing apparatus, comprising:

delayed signal generating means for sequentially delaying a clock signal generated by a signal generator and generating a plurality of delayed clock signals having different amounts of delay;

selecting means for selecting a delayed clock signal changing at a rising edge or a falling edge of a horizontal synchronizing signal from among the plurality of delayed clock signals generated by the delayed signal generating means, wherein the selecting means comprises:

a plurality of flip-flops for detecting status of each of the delayed clock signals at the rising edge or falling edge of the horizontal synchronizing signal; and change point detecting means for receiving detected signals from the plurality of flip-flops and detecting a delayed clock signal having a change point which changes at the rising edge or falling edge of the horizontal synchronizing signal, whereby the phase of the clock signal generated by the signal generator is synchronized with the phase of the horizontal synchronizing signal.

* * * * *